US012464272B2

(12) United States Patent
King et al.

(10) Patent No.: US 12,464,272 B2
(45) Date of Patent: Nov. 4, 2025

(54) MICRO-SPEAKER FOR EAR-WORN HEARING DEVICE

(71) Applicant: Knowles Electronics, LLC, Itasca, IL (US)

(72) Inventors: Charles B. King, Oak Park, IL (US); Thomas E. Miller, Arlington Heights, IL (US); Mohammad Mohammadi, Rolling Meadows, IL (US)

(73) Assignee: Knowles Electronics, LLC, Itasca, IL (US)

( * ) Notice: Subject to any disclaimer, the term of this patent is extended or adjusted under 35 U.S.C. 154(b) by 168 days.

(21) Appl. No.: 18/536,169

(22) Filed: Dec. 11, 2023

(65) Prior Publication Data

US 2025/0193563 A1 Jun. 12, 2025

(51) Int. Cl.
*H04R 1/02* (2006.01)

(52) U.S. Cl.
CPC ......... *H04R 1/02* (2013.01); *H04R 2201/003* (2013.01); *H04R 2201/023* (2013.01)

(58) Field of Classification Search
CPC . H04R 1/02; H04R 23/02; H04R 1/10; H04R 1/2849; H04R 17/00; H04R 19/02; H04R 2201/003; H04R 2201/023; H04R 2217/03
USPC .......................................................... 381/396
See application file for complete search history.

(56) References Cited

U.S. PATENT DOCUMENTS 8,861,752 B2 10/2014 Margalit
9,913,048 B2 3/2018 Margalit
10,123,126 B2 11/2018 Margalit
10,271,146 B2 4/2019 Margalit
10,284,961 B2 5/2019 Margalit
11,323,816 B2 5/2022 Margalit
11,343,609 B2 5/2022 Margalit
2021/0195335 A1 6/2021 Margalit
2022/0183659 A1 6/2022 Margalit
2023/0171532 A1 * 6/2023 Wilk ........................ H04R 1/22 381/61

OTHER PUBLICATIONS

A. Robichaud et al., A System in Package Based on a Piezoelectric Micromachined Ultrasonic Transducer Matrix for Ranging Applications, Sensors 2021, 21, 2590, https://doi.org/10.3390/s21082590 Apr. 7, 2021, pp. 1-10.

* cited by examiner

*Primary Examiner* — Paul Kim
(74) *Attorney, Agent, or Firm* — Hickman Becker Bingham Ledesma LLP; Matthew C. Loppnow

(57) ABSTRACT

A micro-speaker for use in hearing and other body worn devices is disclosed, including an acoustic conduit defining an acoustic path between first and second air spaces. A first acoustic transducer is located between the acoustic conduit and the first air space and a second acoustic transducer located between the acoustic conduit and the second air space. The second acoustic transducer is operable to more or less obstruct an acoustic aperture between the acoustic conduit and the second air space, wherein concurrent operation of the first and second acoustic transducers generates an acoustic audio signal that propagates between the first and second air spaces. An acoustic vent between the acoustic conduit and the second air space has an acoustic impedance that is independent of the operation of the second acoustic transducer.

20 Claims, 5 Drawing Sheets

MICRO-SPEAKER FOR EAR-WORN HEARING DEVICE

FIELD OF THE DISCLOSURE

The present disclosure relates generally to micro-speakers suitable for ear-worn hearing devices and more particularly to improvements in micro-speakers that produce an acoustic audio signal by modulating an acoustic carrier signal.

BACKGROUND

Ear-worn hearing devices generally comprise a balanced armature receiver, a dynamic speaker or a combination thereof depending on the device type and use case. Such devices include receiver-in-canal (RIC) hearing aids, True Wireless Stereo (TWS) earphones, and in-car monitors. These and other ear-worn hearing devices have limited space into which an ever increasing number of components like batteries, audio signal processors, and sensors may be integrated.

A known micro-speaker that produces a low-frequency output has potential to replace bulky dynamic speakers and complement frequency response produced by one or more balanced armature receivers. The known micro-speaker comprises an oscillating membrane driven to produce an ultrasonic carrier signal, or wave, in an acoustic pipe having one or more apertures. A shutter driven by a modulation signal obscures or reveals the one or more apertures through which the ultrasonic carrier wave propagates. The action of the shutter in the presence of the ultrasonic carrier wave produces an acoustic signal representative of a desired audio signal on which the modulation signal is based. Such micro-speakers are fabricated using microelectromechanical systems (MEMS) technology and can be combined in an array to increase sound output. However, the acoustic signal produced by these micro-speakers tends to be distorted by non-linear effects of modulating the ultrasonic carrier wave. Thus there is an ongoing need to improve micro-speakers that produce an acoustic audio signal by modulating an acoustic carrier signal.

BRIEF DESCRIPTION OF THE DRAWINGS

The objects, features and advantages of the present disclosure will become more fully apparent to those of ordinary skill in the art upon consideration of the following detailed description and appended claims in conjunction with the accompanying drawings. The drawings depict only representative embodiments and are not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described, that some or all such actions or steps may be performed concurrently unless specified otherwise, and that the terms and expressions used herein have meanings understood by those of ordinary skill in the art, except where a different meaning is specifically attributed to them herein.

DETAILED DESCRIPTION

The present disclosure relates generally to micro-speakers and more particularly to improved micro-speakers that produce an acoustic audio signal by modulating an acoustic carrier wave. The improvement is characterized by reduced distortion of the acoustic audio signal produced by the micro-speaker. Such micro-speakers are suitable for use in ear-worn hearing devices including but not limited to True Wireless Stereo (TWS) earphones, in-ear monitors, and hearing aids including receiver-in-canal (RIC) devices, in-the-ear (ITE) devices, and in-the-canal (ITC) type devices, among others. The micro-speakers described herein can also be used in other ear and body wearable devices. Representative examples are described further herein.

The micro-speakers described herein generally comprise a body member including an acoustic conduit at least partially defining an acoustic path between first and second exterior acoustic medium spaces between which the body member is located. The exterior acoustic medium spaces can be air spaces or some other medium through which acoustic signals can propagate. A first acoustic transducer is located between the acoustic conduit and the first air space, and a second acoustic transducer is located between the acoustic conduit and the second air space. An acoustic aperture between the acoustic conduit and the second air space is more or less obstructed by operation of the second acoustic transducer, wherein concurrent operation of the first and second acoustic transducers generates an acoustic audio signal that propagates between the first and second air spaces. An acoustic vent comprising an acoustic impedance independent of the operation of the second acoustic transducer is located between the acoustic conduit and the second air space as described further herein. The acoustic vent can reduce distortion of the acoustic audio signal produced by the micro-speaker by reducing acoustic impedance between the acoustic conduit and the air space exterior of the acoustic conduit.

Figure 1:
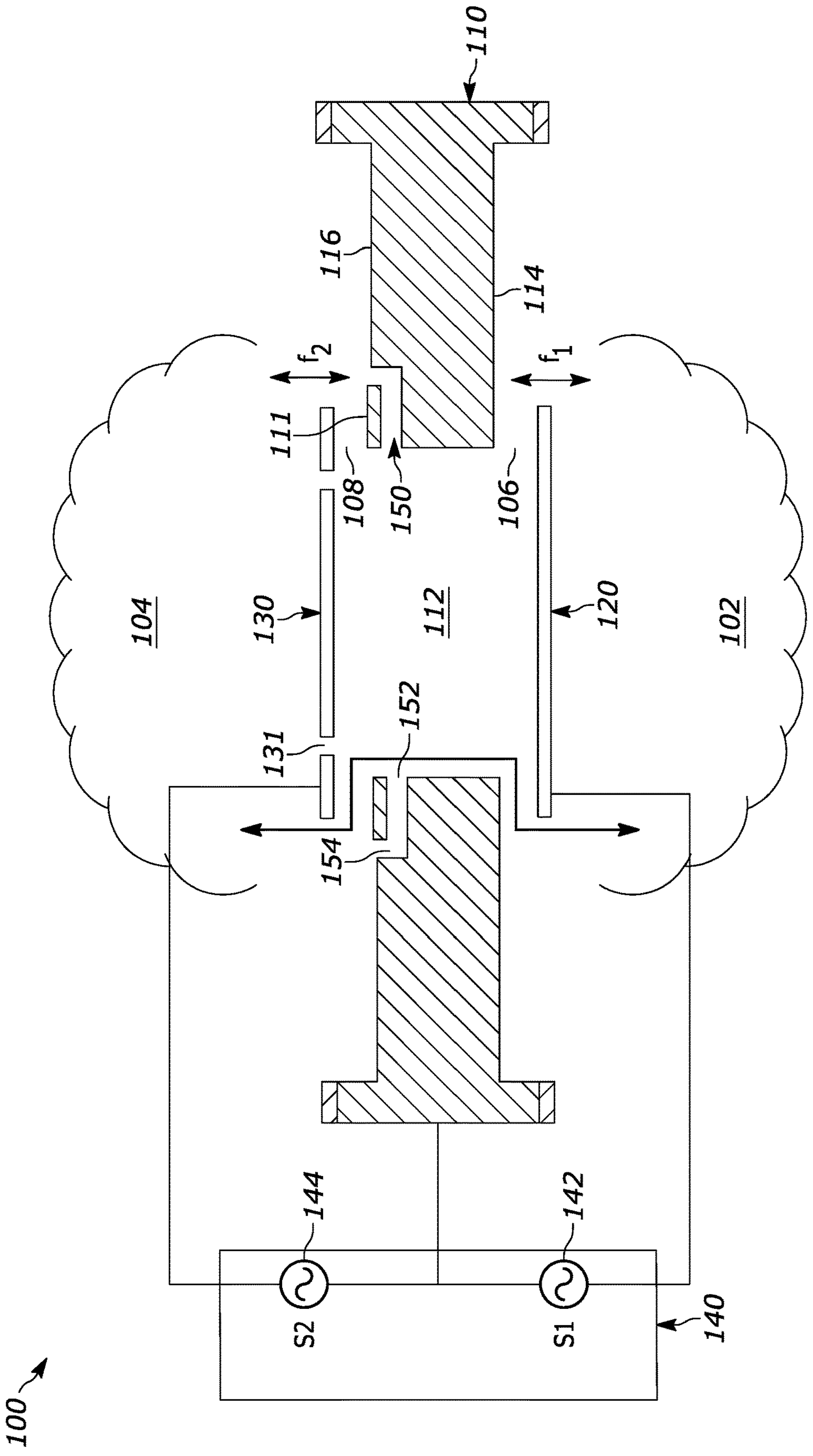
FIG. 1 is schematic sectional view of a micro-speaker comprising first and second acoustic transducers and corresponding drivers.

In FIG. 1, the micro-speaker 100 comprises a body member 110 comprising an acoustic conduit 112 extending between openings at first and second opposite sides or surfaces 114, 116 of the body member. The acoustic conduit at least partially defines an acoustic path 101 between first and second air spaces between which the body member is located. The first and second air spaces each comprise a corresponding space 102, 104 adjacent a corresponding side of the micro-speaker. In FIGS. 2-6, the representative micro-speakers 100 comprise acoustic conduits 112 extending between openings at the first and second sides 114, 116 of the body member. The acoustic conduit at least partially defines an acoustic path between first and second exterior air spaces adjacent corresponding sides of the micro-speaker.

The body member can comprise a unitary member or an assembly of multiple parts or components.

In FIG. 1, a first acoustic transducer 120 is acoustically coupled to the acoustic conduit 112 via a first opening on the first side of the body member 110, and a second acoustic transducer 130 is acoustically coupled to the acoustic conduit via a second opening on the second side of the body member. The representative acoustic openings are shown on opposite sides of the body member, but in other implementations can be different sides of the body member. The acoustic transducers can be capacitive, piezoelectric or some other type of acoustic transducer, or a combination of different types of transducers. In one implementation, the first acoustic transducer is a piezoelectric device and the second acoustic transducer is a capacitive device. The piezoelectric transducer can be prefabricated and assembled with a body member and second acoustic transducer fabricated using MEMS technology. In another implementation, the second acoustic transducer can be implemented as a shutter that moves laterally across the second opening, i.e., transverse to an axial dimension of the acoustic conduit at the opening. In the latter implementation, the first acoustic transducer can be capacitive, piezoelectric, or some other acoustic wave generating transducer.

Figure 2:
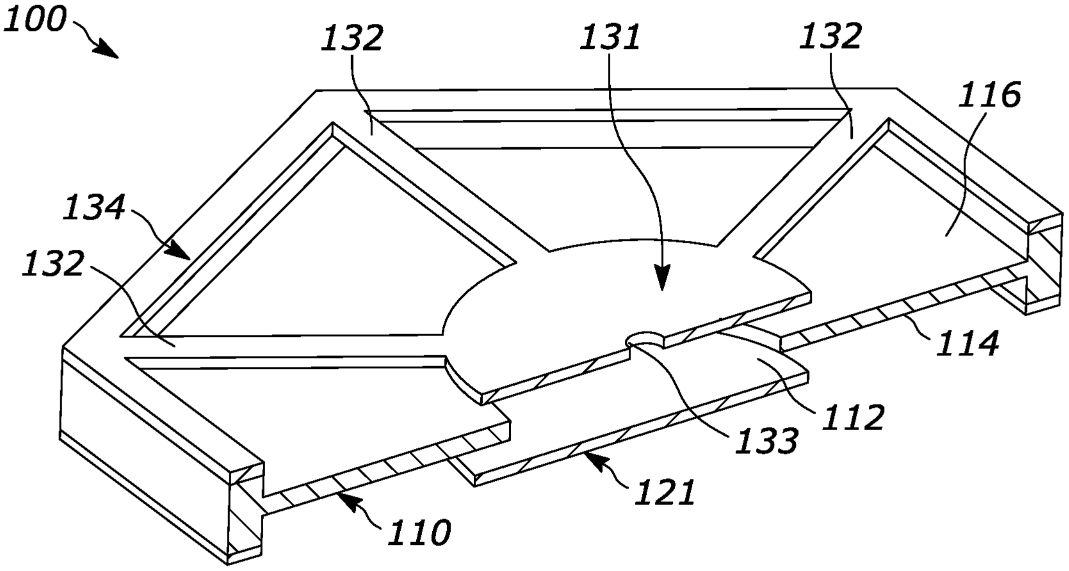
FIG. 2 is a perspective sectional view of a representative micro-speaker comprising a vented diaphragm.
Figure 5:
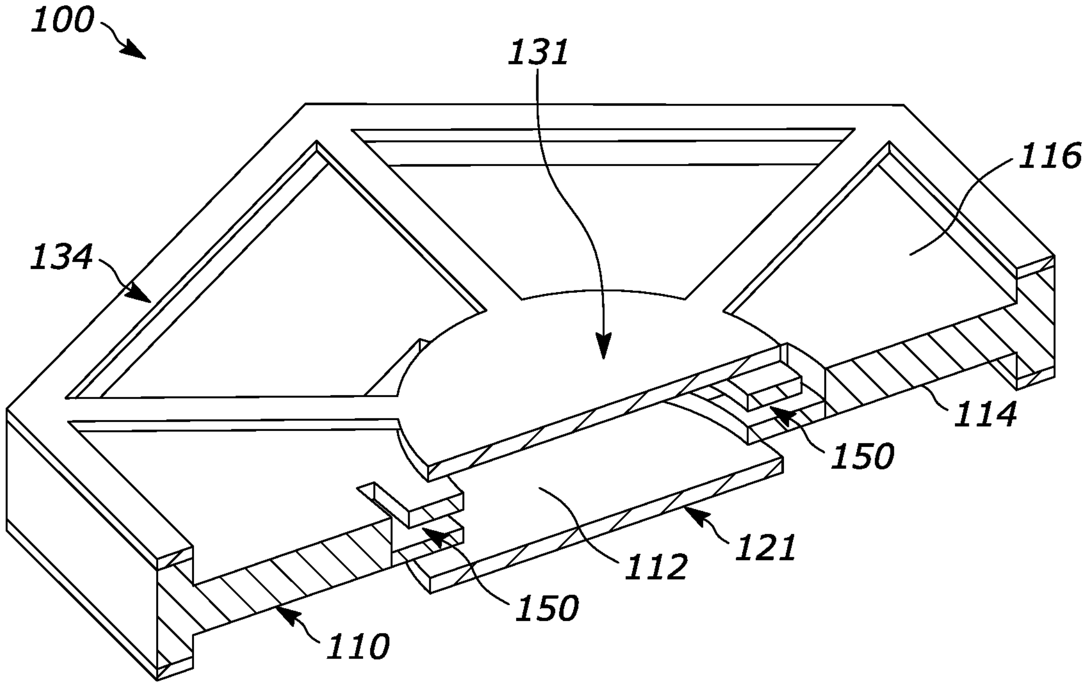
FIG. 5 is a perspective sectional view of a representative micro-speaker comprising a vented body member.
Figure 6:
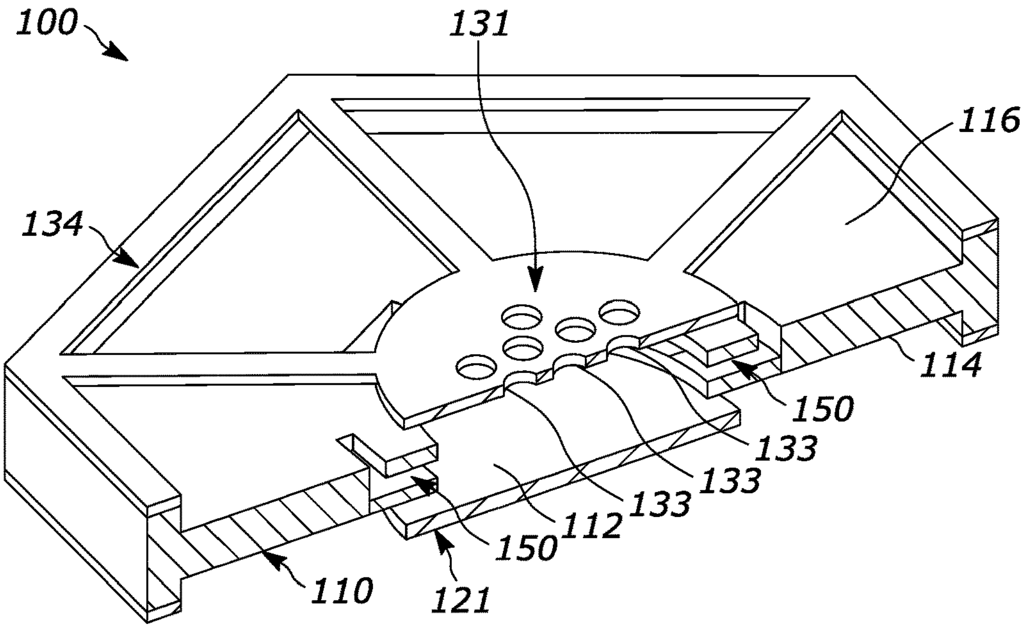
FIG. 6 is a perspective sectional view of a representative micro-speaker comprising a vented diaphragm and a vented body member.
Figure 7:
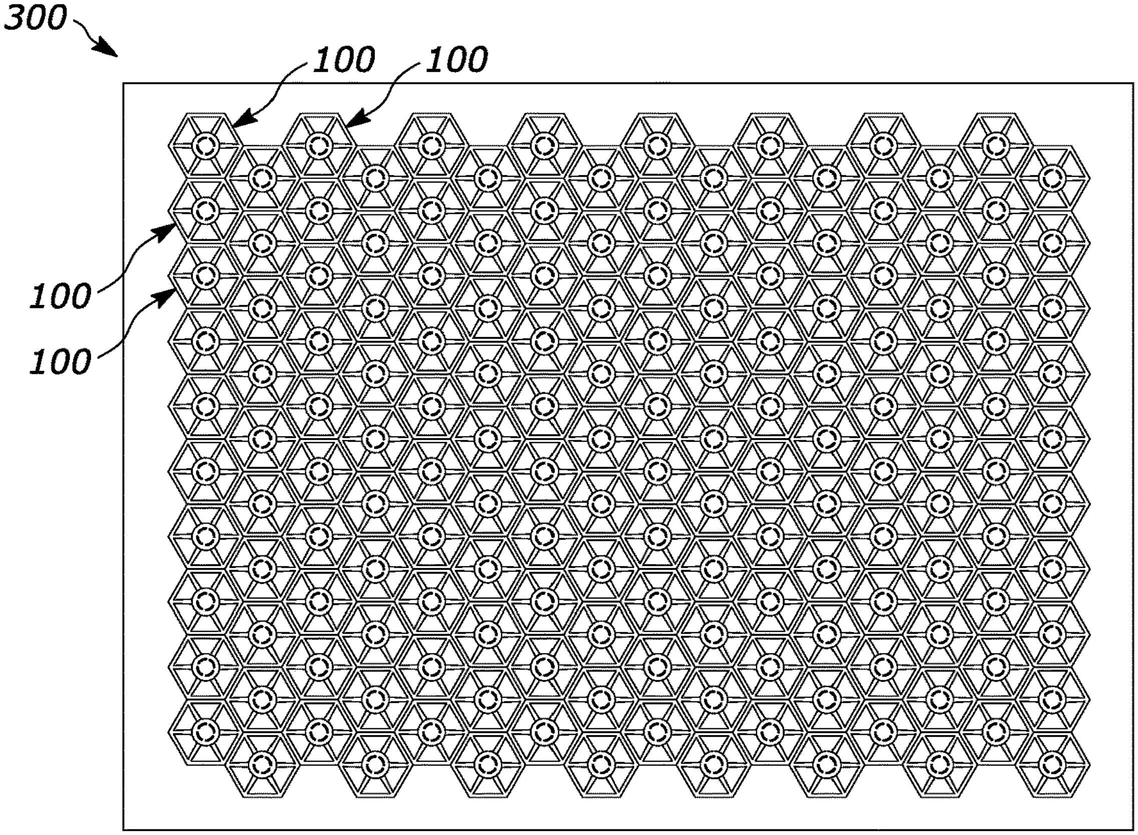
FIG. 7 is an array of micro-speaker cells on a common substrate.

In FIGS. 2-6, the representative first and second acoustic transducers 120, 130 are capacitive devices comprising among other elements corresponding first and second diaphragms 121, 131 proximate corresponding openings in the body member. The body member and diaphragms comprise corresponding conductive portions between which corresponding drive signals can be applied to actuate the diaphragms. Adjacent portions of the body member 110 and diaphragms 121, 131 can be non-conductive to prevent an electrical short circuit. In FIG. 2, the second acoustic transducer comprises one or more flexible arms or springs 132 extending radially between the diaphragm and a support structure 134 on a peripheral portion of the body member 110. The one or more flexible arms support and permit deflection of the diaphragm in response to the drive signal. In some implementations, diaphragm deflection is proportional to a dimension of the one or more flexible arms. The representative first and second diaphragms in FIGS. 2-6 can be supported by similar structure. Thus configured, the first and second diaphragms move toward and away from corresponding openings of the acoustic conduit in response to corresponding drive signals. In FIG. 7, an array 300 of micro-speaker cells 100 are fabricated on a common substrate 103 to increase acoustic output.

The micro-speaker and array of micro-speakers described herein can be fabricated in whole or in part using microelectromechanical systems (MEMS) technology among other fabrication processes and techniques, depending on the transducer type and use case. In FIGS. 2-6, for example, the body member and diaphragms of the first and acoustic transducers can be fabricated on a substrate comprising silicon or some other material. These and other portions of the micro-speaker can be fabricated by patterning the deposition of thin films on a substrate and etching portions to create various structures and movable parts. Such MEMS fabrication can be scaled for an array of micro-speakers. Representative materials suitable for MEMS fabrication include silicon, silicon dioxide, silicon nitride and polysilicon, lead zirconate titanate (PZT) and aluminum nitride among others. Conductive portions can be formed on various parts of the micro-speaker by selective doping or metalization. Representative individual MEMS micro-speakers have an area between 0.004 $mm^2$ and 4.0 $mm^2$ and a representative array of individual MEMS micro-speakers (wherein each MEMS micro-speaker is also referred to herein as a "cell") shown in FIG. 7 can have an area up to and greater than 1000 $mm^2$ depending on the use case.

In operation, generally, the first acoustic transducer produces an acoustic wave that propagates through the acoustic conduit between the first and second air spaces. The second acoustic transducer modulates the acoustic wave produced by the first acoustic transducer as the acoustic wave propagates between the first and second air spaces. Concurrent operation of the first and second acoustic transducers generates an acoustic audio signal that propagates through the acoustic conduit between the first and second exterior medium spaces.

The first and second acoustic transducers are operable in response to corresponding first and second electrical drive signals provided by a driver circuit. The first and second electrical drive signals have different signal characteristics, like amplitude, frequency and/or phase. The first and second electrical drive signals are each generated with an acoustic carrier signal. In at least one of the first and second drive signals, the acoustic carrier signal is modulated by an electrical audio signal. The modulation can be based on changes in amplitude, frequency or phase of the carrier signal. The acoustic audio signal produced by the micro-speaker is based on the electrical audio signal modulated on the acoustic carrier signal. The first and second electrical drive signals can each comprise ultrasonic signals greater than about 20 kHz, the upper limit of most humans' sound perception. In one implementation, the first and second electrical drive signals each comprise an ultrasonic signal having a frequency of about 40 kHz, more or less. In another implementation, the first and second electrical drive signals have frequencies on the order of 100 kHz, e.g., 500 kHz or more. The electrical audio signal modulated on the carrier wave is demodulated by interaction between the ultrasonic wave produced by the first acoustic transducer and the motion of the second acoustic transducer.

In FIG. 1, a driver circuit 140 comprises a first drive signal source 142 that generates an acoustic carrier signal $S_1$ having a frequency $f_1$ applied to the first acoustic transducer 120, and a second drive signal source 144 that generates an acoustic carrier signal $S_2$ having a frequency $f_2$ modulated by the electrical audio signal and applied to the second acoustic transducer 130. The first acoustic transducer produces the acoustic carrier wave that propagates though the acoustic conduit, and the second acoustic transducer modulates the propagation of the acoustic carrier wave between the first and second air spaces to produce the acoustic audio signal as described. In other implementations, the electrical audio signal can be modulated on the acoustic carrier $S_1$ applied to the first acoustic transducer.

In FIG. 1, a first acoustic aperture 106 is located between the acoustic conduit 112 and the first air space 102, wherein the acoustic wave propagating between the acoustic conduit and the first air space passes through the first acoustic aperture. The first acoustic transducer or a portion thereof (e.g., the diaphragm, flexible arms, shutter) overlaps a portion of the body member adjacent a periphery of the first opening, wherein the first acoustic aperture is located at least partially between the first side 114 of the body member and the first acoustic transducer 120. In another implementation, the first acoustic transducer or a portion thereof operates at least partially within the acoustic conduit, wherein the first acoustic aperture is between an outer periphery of the diaphragm and a wall portion of the acoustic conduit.

Generally operation of the second acoustic transducer more or less obstructs the second acoustic aperture to modulate the ultrasonic wave propagating between the acoustic conduit and the second air space. An acoustic impedance of the second acoustic aperture is dependent on the operation of the second acoustic transducer and particularly on the extent to which the acoustic aperture is obstructed by the diaphragm or shutter. In FIG. 1, a second acoustic aperture 108 is located between the acoustic conduit 112 and the second air space 104, wherein the acoustic wave propagating between the acoustic conduit and the second air space passes through the second acoustic aperture. The second acoustic transducer 130 or a portion thereof, e.g., the shutter or diaphragm, overlaps a portion 111 of the body member adjacent a periphery of the second opening. The second acoustic aperture is located at least partially between the portion 111 of the body member and the diaphragm or shutter of the second acoustic transducer. In another implementation, the second acoustic transducer does not overlap the body member and operates to more or less close the second opening of the acoustic conduit, wherein the second acoustic aperture is between an outer periphery of the second acoustic transducer or portion thereof and the acoustic conduit. Generally, an area of the diaphragm and an area of the opening of the acoustic conduit differ by not more than 20%. In another implementation, the second acoustic transducer comprises a shutter that more or less obstructs the second opening of the acoustic conduit as the shutter move laterally across the second surface 116 of the body member.

The micro-speaker also generally comprises an acoustic vent between the acoustic conduit and the second exterior air space, wherein the acoustic vent reduces acoustic impedance between the acoustic conduit and an air space exterior of the acoustic conduit. The acoustic impedance of the acoustic vent is independent of the operation of the first and second acoustic transducers. Generally, an area of the acoustic vent is between 10 percent and 50 percent of an area of the opening of the acoustic conduit.

Figure 3:
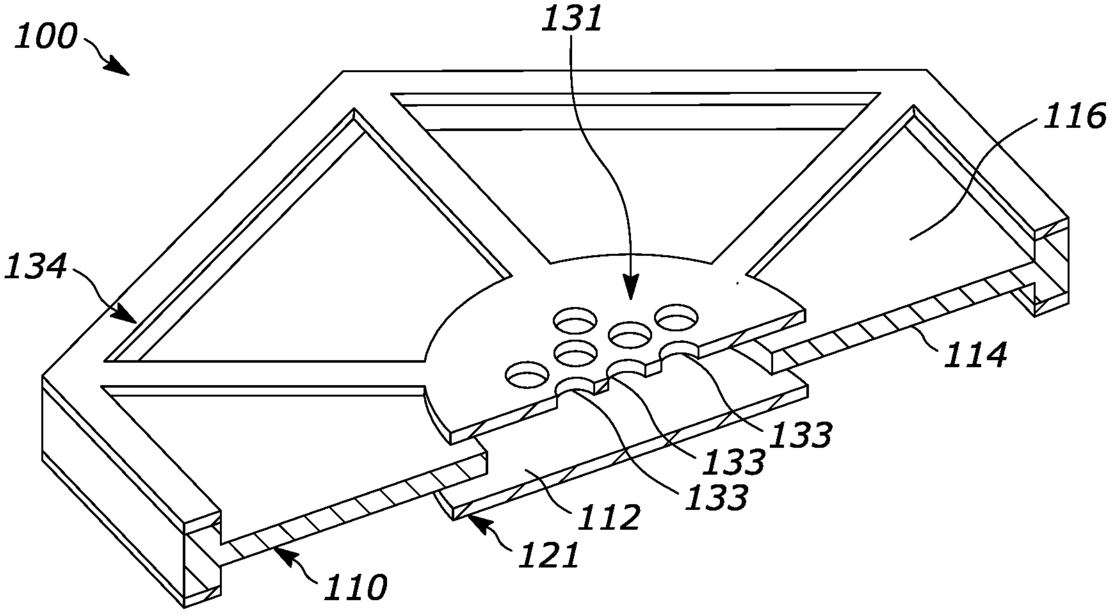
FIG. 3 is a perspective sectional view of a representative micro-speaker comprising an alternative diaphragm vent.
Figure 4:
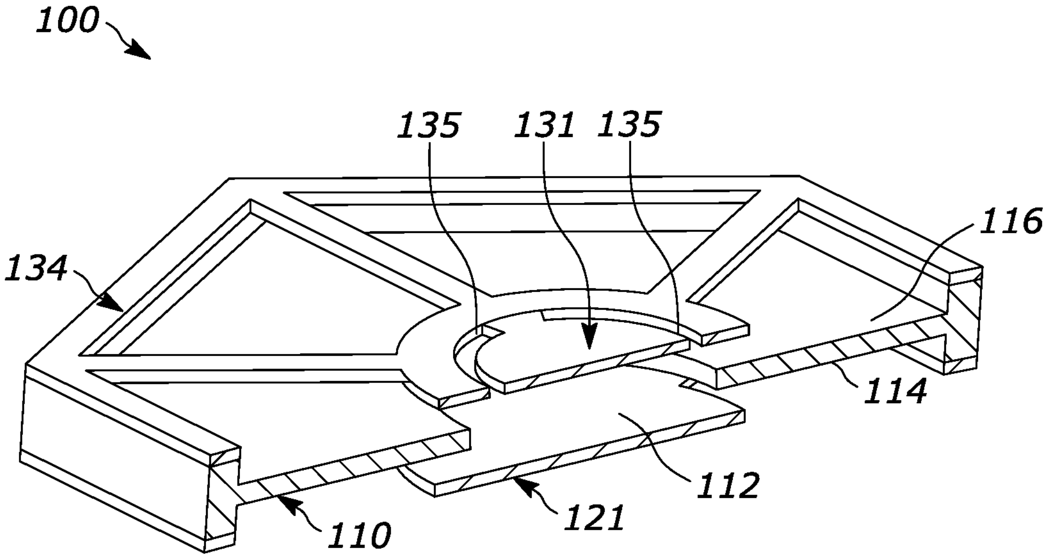
FIG. 4 is a perspective sectional view of a representative micro-speaker comprising another alternative diaphragm vent.

In one implementation, the acoustic vent comprises an acoustic passage that extends through the second acoustic transducer or shutter. In FIGS. 1 and 3, multiple apertures 133 extend through the second acoustic transducer. In FIG. 2, the acoustic vent comprises a single aperture 133 extending through the diaphragm 131 of the second acoustic transducer. In FIG. 4, one or more slots 135 extend through the diaphragm of the second acoustic transducer.

In another implementation, the acoustic vent comprises one or more passages between the acoustic conduit and a surface of the body member surrounding an opening of the acoustic conduit. In FIG. 1, a representative acoustic vent in the body member comprises a first vent passage portion 152 fully embedded in the body member 110 and extending outwardly from the acoustic conduit 112. The acoustic vent also comprises a second vent passage portion 154 extending upwardly from the first vent passage portion 152 to the second surface 116 of the body member. The acoustic vent can extend beyond an outer periphery of the second acoustic transducer as shown. In other implementations, the acoustic vent does not extend beyond the outer periphery of the second acoustic transducer. Alternatively, the first vent passage portion 152 can be an open channel on the second surface 116 of the body member, without the need for the second vent passage 154. In FIG. 5, the acoustic vent comprises multiple vent passages 150 in the body member extending between the acoustic conduit 112 and the second surface 116 of the body member. Alternatively, the acoustic vent can be located in both the acoustic transducer and in the body member, as shown in FIG. 6. The acoustic vent can be readily fabricated using MEMS technology.

Figure 8:
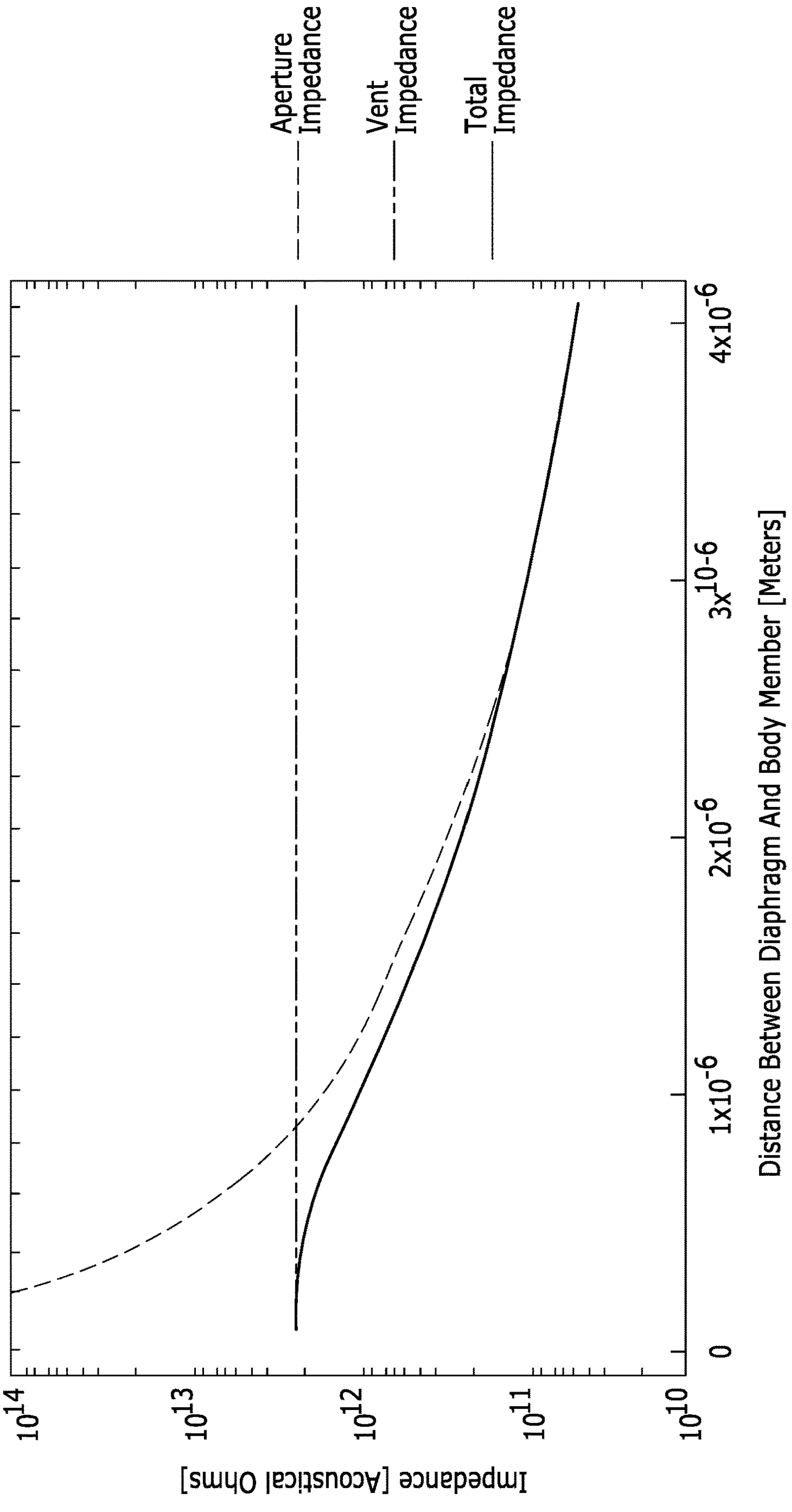
FIG. 8 is a plot of a non-linear impedance characteristic of a micro-speaker.

FIG. 8 depicts plots obtained by modelling acoustic resistance versus a characteristic of the acoustic aperture in a micro-speaker, with and without an acoustic vent. The characteristic of the acoustic aperture can be a measure of a gap or distance between an outer surface of the body member and the diaphragm. In FIG. 1, the distance is measured between the surface 116 of the body member and the diaphragm 131. The model assumes that the acoustic aperture is adjacent the acoustic transducer driven by the electrical drive signal comprising the acoustic carrier signal modulated by the electrical audio signal. In FIG. 8, the dashed line represents the variable impedance of the acoustic aperture as a function of the gap or distance between the diaphragm and the surface of the body member. The dotted line represents a constant acoustic vent impedance that is independent of transducer operation. The solid line represents the total system impedance. The total system impedance has less variation and thus will produce lower distortion in the output acoustic signal.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. A wearable micro-speaker comprising:

a body member comprising an acoustic conduit at least partially defining an acoustic path between first and second exterior medium spaces between which the body member is located;

a first acoustic transducer located between the acoustic conduit and the first exterior medium space;

a second acoustic transducer located between the acoustic conduit and the second exterior medium space;

a second acoustic aperture between the acoustic conduit and the second exterior medium space, the second acoustic aperture more or less obstructed by operation of the second acoustic transducer, wherein concurrent operation of the first and second acoustic transducers generates an acoustic audio signal that propagates between the first and second exterior medium spaces;

an acoustic vent between the acoustic conduit and the second exterior medium space, an acoustic impedance of the acoustic vent independent of the operation of the second acoustic transducer.

2. The micro-speaker of claim 1, wherein the acoustic vent reduces acoustic impedance between the acoustic conduit and the second exterior medium space.

3. The micro-speaker of claim 1, wherein the acoustic impedance of the acoustic vent is independent of the operation of the first acoustic transducer.

4. The micro-speaker of claim 1, wherein the acoustic vent extends through the second acoustic transducer.

5. The micro-speaker of claim 1, wherein a cross-sectional area of the acoustic vent is between 10 percent and 50 percent of an area of an opening of the acoustic conduit between the acoustic conduit and the second acoustic transducer.

6. The micro-speaker of claim 1, the acoustic vent comprising an at least partially open channel on a surface of the body member surrounding an opening of the acoustic conduit, the channel extending outwardly from a peripheral edge of the opening.

7. The micro-speaker of claim 1, the second acoustic transducer comprising a diaphragm movable toward and away from an opening of the body member, the opening acoustically coupled to the acoustic conduit.

8. The micro-speaker of claim 7, an area of the diaphragm and an area of the opening differing by not more than 20%.

9. The micro-speaker of claim 1, the first and second acoustic transducers operable in response to corresponding first and second drive signals at frequencies greater than 40 kHz, at least one of the first and second drive signals modulated by an electrical audio signal on which the acoustic audio signal is based, wherein the acoustic audio signal is based on characteristics of the first and second drive signals.

10. The micro-speaker of claim 9, wherein the second acoustic transducer is operable in response to the second drive signal modulated by the electrical audio signal.

11. A microelectromechanical systems (MEMS) speaker comprising:

a body member comprising an acoustic conduit extending between first and second opposite sides of the body member;

a first acoustic transducer acoustically coupled to the acoustic conduit via a first opening on the first side of the body member;

a second acoustic transducer acoustically coupled to the acoustic conduit via a second opening on the second side of the body member;

an acoustic aperture between the acoustic conduit and the second acoustic transducer, the acoustic aperture more or less obstructed by operation of the second acoustic transducer, an acoustic impedance of the second acoustic aperture dependent on operation of the second acoustic transducer;

an acoustic vent located in the second acoustic transducer, an acoustic impedance of the acoustic vent independent of the operation of the second acoustic transducer, wherein concurrent operation of the first and second acoustic transducers generates an acoustic audio signal that propagates through the acoustic conduit.

12. A wearable micro-speaker comprising:

a body member comprising an acoustic conduit extending between first and second opposite sides of the body member;

a first acoustic transducer acoustically coupled to the acoustic conduit via a first opening on the first side of the body member;

a second acoustic transducer acoustically coupled to the acoustic conduit via a second opening on the second side of the body member;

a second acoustic aperture between the acoustic conduit and the second acoustic transducer, the second acoustic aperture more or less obstructed by operation of the second acoustic transducer, an acoustic impedance of the second acoustic aperture dependent on operation of the second acoustic transducer, wherein concurrent operation of the first and second acoustic transducers generates an acoustic audio signal that propagates through the acoustic conduit;

an acoustic vent located in the second acoustic transducer, an acoustic impedance of the acoustic vent independent of the operation of the second acoustic transducer.

13. The micro-speaker of claim 12 further comprising an acoustic flow path between the first and second sides of the boy member and through the acoustic conduit during operation of the first and second acoustic transducers.

14. The micro-speaker of claim 12, wherein the acoustic impedance of the acoustic vent is independent of the operation of the first acoustic transducer.

15. The micro-speaker of claim 12, wherein the acoustic vent reduces acoustic impedance between the acoustic conduit and an exterior of the body member.

16. The micro-speaker of claim 12, wherein a cross-sectional area of the acoustic vent is between 10 percent and 50 percent of an area of the second opening on the second side of the body member.

17. The micro-speaker of claim 12, the second acoustic transducer comprising a diaphragm movable toward and away from the second opening on the second side of the body member, wherein the acoustic vent is disposed through the diaphragm.

18. The micro-speaker of claim 17, an area of the diaphragm and an area of the second opening differing by not more than 20%.

19. The micro-speaker of claim 12 is one of multiple micro-speakers fabricated on a common substrate.

20. The micro-speaker of claim 12, the first and second acoustic transducers operable in response to corresponding first and second drive signals having different characteristics, at least one of the first and second drive signals modulated by an electrical audio signal on which the acoustic audio signal is based, wherein the first and second drive signals comprise frequencies greater than 40 kHz.

* * * * *